United States Patent
Ford et al.

(10) Patent No.: US 7,459,666 B2
(45) Date of Patent: Dec. 2, 2008

(54) BATTERY COMPARTMENT ADAPTER CAP FOR CONTROL OF ELECTRIC POWER AND DEVICE EQUIPPED THEREWITH

(75) Inventors: Timothy D. F. Ford, Beaconsfield (CA); Stéphane Gascon, Mascouche (CA)

(73) Assignee: The Flewelling Ford Family Trust, Beaconsfield (CA)

( * ) Notice: Subject to any disclaimer, the term of this patent is extended or adjusted under 35 U.S.C. 154(b) by 37 days.

(21) Appl. No.: 11/056,088

(22) Filed: Feb. 14, 2005

(65) Prior Publication Data
US 2006/0171145 A1 Aug. 3, 2006

Related U.S. Application Data

(60) Provisional application No. 60/544,180, filed on Feb. 13, 2004.

(51) Int. Cl.
*H03K 17/78* (2006.01)
*H01J 5/02* (2006.01)
*G01J 1/32* (2006.01)

(52) U.S. Cl. .............. 250/214 SW; 250/239; 250/205

(58) Field of Classification Search .......... 250/214.1, 250/205, 239, 221, 214 SW; 315/82, 200 A, 315/149, 154; 362/208, 205, 251, 800, 183; 340/815.4, 815.45, 815.65–815.67, 425.1; 429/97
See application file for complete search history.

(56) References Cited

U.S. PATENT DOCUMENTS

| | | | |
|---|---|---|---|
| 4,114,187 A | 9/1978 | Uke | 362/158 |
| 4,325,107 A | 4/1982 | Macleod | 362/183 |
| 4,357,648 A | 11/1982 | Nelson | 362/183 |
| 4,866,580 A * | 9/1989 | Blackerby | 362/205 |
| 5,161,879 A | 11/1992 | McDermott | 362/206 |
| 5,629,105 A | 5/1997 | Matthews | 429/97 |
| 5,697,695 A * | 12/1997 | Lin et al. | 362/184 |
| 5,900,212 A * | 5/1999 | Maiden et al. | 422/24 |
| 5,918,189 A | 6/1999 | Kivela | 455/575 |
| 6,086,218 A * | 7/2000 | Robertson | 362/157 |
| 6,307,328 B1 * | 10/2001 | Ko et al. | 315/200 R |
| 6,616,300 B1 | 9/2003 | Hrabal | 362/258 |
| 6,642,667 B2 * | 11/2003 | Avis | 315/200 A |
| 6,703,786 B2 * | 3/2004 | Tannenbaum | 315/149 |
| 6,808,287 B2 * | 10/2004 | Lebens et al. | 362/184 |
| 6,841,941 B2 * | 1/2005 | Kim et al. | 315/86 |
| 2005/0122714 A1 * | 6/2005 | Matthews et al. | 362/206 |

FOREIGN PATENT DOCUMENTS

DE 4127765 * 2/1993

* cited by examiner

*Primary Examiner*—Que T. Le
*Assistant Examiner*—Pascal M Bui-Pho
(74) *Attorney, Agent, or Firm*—Goudreau Gage Dubuc

(57) ABSTRACT

A signalling device comprising an emission module operative on the application of battery power from a battery pack for the emission of a signal from at least one electromagnetic radiation emitting element, a battery compartment and a cap for retaining said battery pack in said battery compartment. The cap comprises at least one sensor and a switch for controlling the application of battery power. The switch is actuated when the at least one sensor detects a change in the environment in the vicinity of the device. Alternatively, the switch can be actuated remotely through a wireless interface or via a trip wire.

34 Claims, 10 Drawing Sheets

BATTERY COMPARTMENT ADAPTER CAP FOR CONTROL OF ELECTRIC POWER AND DEVICE EQUIPPED THEREWITH

The present invention claims the benefit of a commonly assigned provisional application entitled "Battery Compartment Adaptor Cap Assembly and Device Equipped Therewith", which was filed on Feb. 13, 2004 and assigned the Ser. No. 60/544,180. The entire contents of the foregoing provisional patent application are hereby incorporated by reference.

FIELD OF THE INVENTION

The present invention relates to a battery compartment adaptor cap and devices equipped with the battery compartment adaptor cap. In particular, the present invention relates to provision of additional functions and versatility to a signalling device by provision of a variety of adaptor caps with different functions. This allows for modular upgrades and enhancements.

BACKGROUND OF THE INVENTION

The prior art reveals a variety of light emitting devices not only for the purposes of illumination but also for notification, alerting and identification. Recent improvements in high-intensity light emitting diodes (LEDs) have allowed arrays of small high-intensity lights of differing colours or wavelengths to be combined in a single signalling device.

A drawback of these prior art inventions is that they typically provide on limited functionality, thereby limiting their use to a small number of applications.

SUMMARY OF THE INVENTION

In order to address the above and other drawbacks there is disclosed a signalling device comprising an emission module operative on the application of battery power from a battery pack and comprising at least one electromagnetic radiation emitting element, an electromagnetic radiation emitting element controller and a multi-position switch for selecting one of a plurality of predetermined control signatures, a battery compartment, and a cap for retaining the battery pack in the compartment, the cap comprising a switch for controlling the application of battery power. When the switch is closed, the controller illuminates the at least one electromagnetic radiation emitting element according to the selected control signature.

There is also disclosed a signalling device comprising an emission module operative on the application of battery power from a battery pack for the emission of a signal from at least one electromagnetic radiation emitting element, a battery compartment and a cap for retaining the battery pack in the battery compartment. The cap comprises a wireless receiver and a switch for controlling the application of battery power. The switch is actuated when the receiver receives a wireless signal from a transmitter.

Additionally, there is disclosed a signalling device comprising an emission module operative on the application of battery power from a battery pack for the emission of a signal from at least one electromagnetic radiation emitting element, a battery compartment; and a cap for retaining the battery pack in the battery compartment. The cap comprises at least one sensor and a switch for controlling the application of battery power. The switch is actuated when the at least one sensor detects a device environment change.

Furthermore, there is disclosed a signalling device comprising an emission module operative on the application of battery power from a battery pack for the emission of a signal from at least one electromagnetic radiation emitting element, a battery compartment and a cap for retaining the battery pack in the battery compartment. The cap comprises a trip wire and a switch for controlling the application of battery power, wherein the switch is closed when a triggering tension is applied to the trip wire.

In addition there is disclosed an electronic device operable on the application of DC power. The device comprises a battery compartment, a battery pack comprising an output and having a nominal voltage and a cap for retaining the battery pack in the battery compartment. The cap comprises a second battery pack comprising an output and having a nominal voltage different from the nominal voltage of the first battery pack and a converter for conditioning the second battery pack output to match the first battery pack nominal voltage. The conditioned output is applied to the device in parallel to the first battery pack output.

Other objects, advantages and features of the present invention will become more apparent upon reading of the following nonrestrictive description of illustrative embodiments thereof, given by way of example only with reference to the accompanying drawings.

DETAILED DESCRIPTION OF THE ILLUSTRATIVE EMBODIMENTS

As is well known in the art, the battery compartment caps of many devices, in particular but not limited to those which emit light such as flashlights and the like, traditionally serve a dual purpose: firstly sealing the battery compartment thereby providing protection against the infiltration of moisture and dirt into the compartment; and secondly providing a point (or points) of electrical contact between the battery or batteries contained within the compartment and the electronics which are powered by the batteries.

Typically, the inside surface of the battery compartment cap is equipped with a raised biased contact plate or helical spring manufactured from a conductive material for contact with the anode (or cathode) of a battery. Additionally, the raised or biased contact plate or helical spring is also in electrical contact with the conductive casing of the battery compartment cap. Thus, placing batteries into the battery compartment and securing the battery compartment cap to the device is all that is necessary to complete an electronic circuit, thereby providing power to the electronics of the device (which also may or may not include an additional on/off switch for interrupting the flow of electrical power to the electronics).

Figure 1:
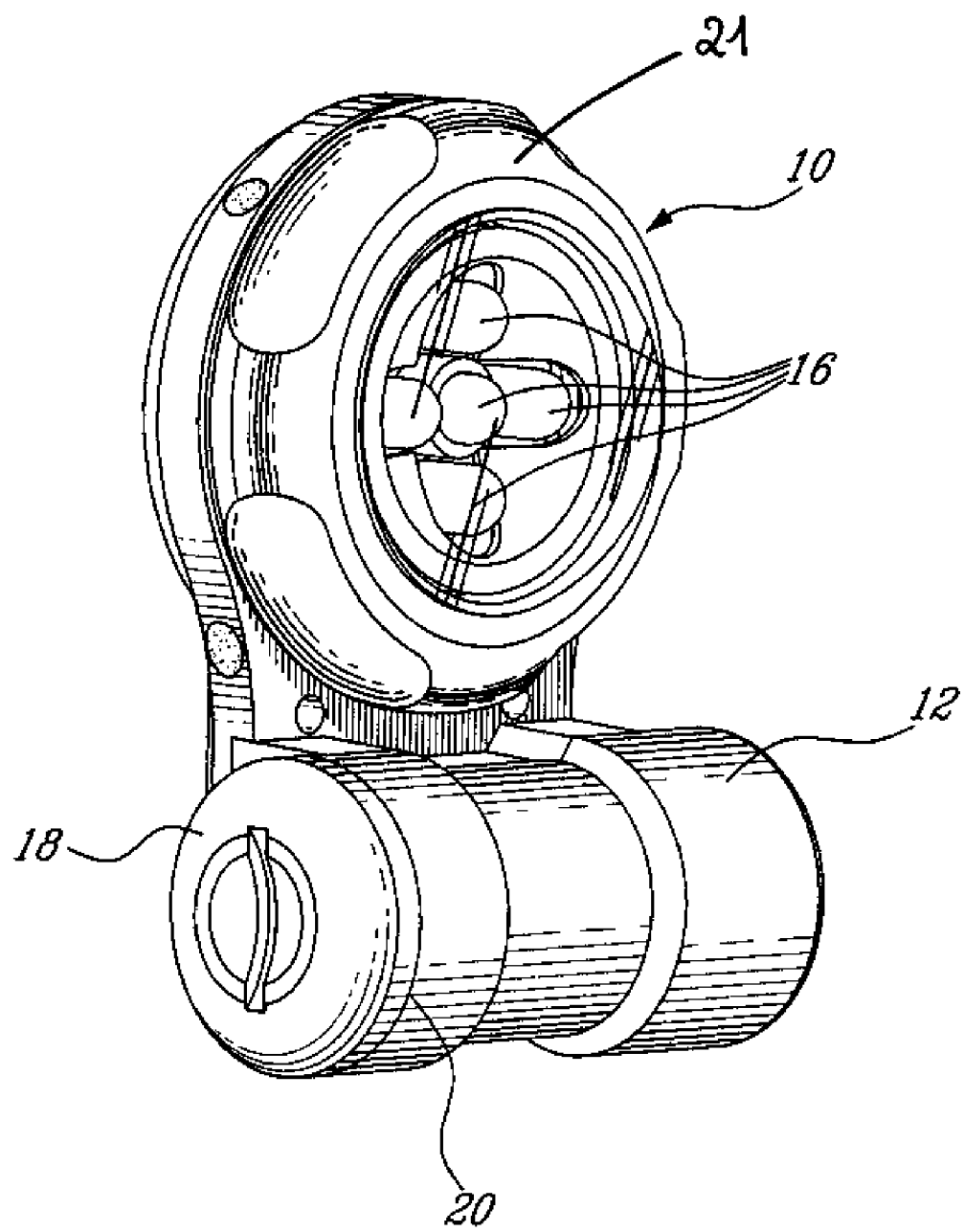
FIG. 1 is a raised front perspective view of a prior art signalling device.

Referring now to FIG. 1, a device 10, such as a conventional flashlight, equipped with a battery compartment 12 for housing a single battery 14 for powering an emission module comprising a controller (not shown) which, controls one or more electromagnetic radiation emitting elements 16, such as LEDs, lasers, incandescent lights, thermal emitters, xenon strobes, etc., is disclosed. A battery compartment cap 18 is screwed on to the threaded end 20 of the battery compartment 12 thereby preventing the egress of moisture and dirt into the compartment 12. The device 10 may also include a multi-position rotary switch 21. Selection of a particular position on the rotary switch 21 causes the electromagnetic radiation emitting elements 16 to be activated, when power from the battery 14 is applied to the controller, according to a selected one of a multiple of control signatures which are stored in memory (not shown). Using the signatures, the electronics control the electromagnetic radiation emitting elements 16 to emit radiation (such as visible light) according to a predefined sequence, for example by flashing repeatedly or according to a recognised pattern, such as the Morse Code for SOS, which is repeated.

Figure 2:
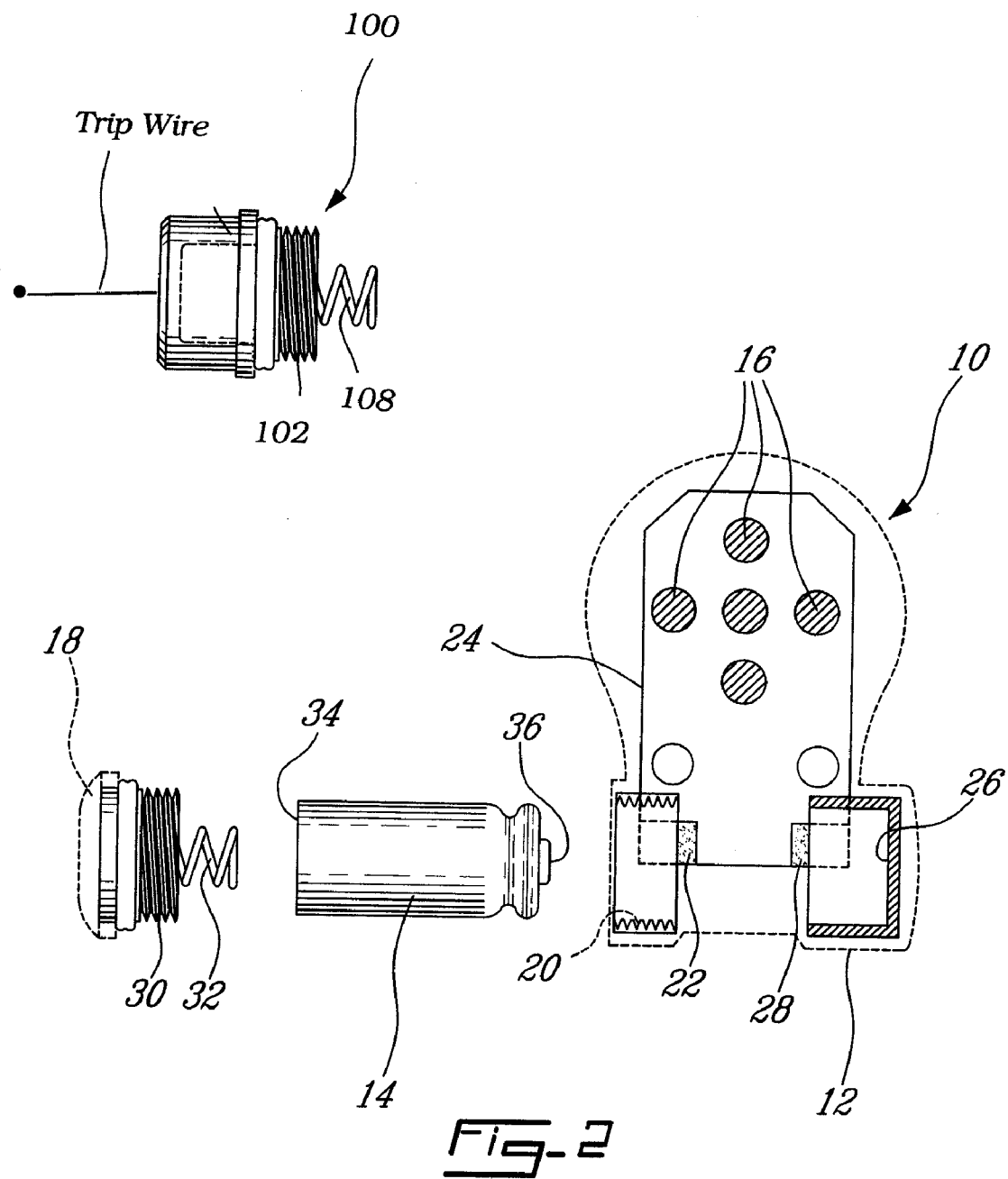
FIG. 2 is a front schematic view of a device in accordance with an illustrative embodiment of the present invention.

Referring now to FIG. 2, the threaded end 20 of the battery compartment is manufactured from a conductive material such as brass and is mounted on a first conductive pad 22 etched into the surface of a printed circuit board (PCB) 24 onto which are also mounted the electronics (not shown) and the elements 16. Similarly, the closed end 26 of the battery compartment 12 is manufactured from a conductive material such as brass and is mounted to a second conductive pad 28 etched into the surface of a printed circuit board (PCB) 24. Both the threaded end 20 and the closed end 26 are mounted to the PCB 24 using, for example, a conductive solder.

The battery compartment cap 18 includes a threaded portion 30, manufactured from a conductive material such as brass, and adapted to mate with the threaded end 20 of the battery compartment 12. The threaded portion 30 is in electrical contact with a conductive helical spring 32. As will now be apparent to a person of ordinary skill in the art, when a battery 14 is inserted into the battery compartment 12 and the cap 18 screwed onto the threaded end 20 of the of the battery compartment 12, the threaded portion 30 of the cap 18, and thus the helical spring 32 and the anode 34 of the battery 14 (or cathode 36, depending on the orientation of the battery 14), is in electrical contact with the threaded end 20 of the battery contact and thus with the first conductive pad 22. Similarly, the biasing action of the helical spring 32 forces the cathode 36 (or anode depending on the orientation of the battery 14) into electrical contact with the closed end 26 of the battery compartment, and thus with the second conductive pad 28.

Figure 3:
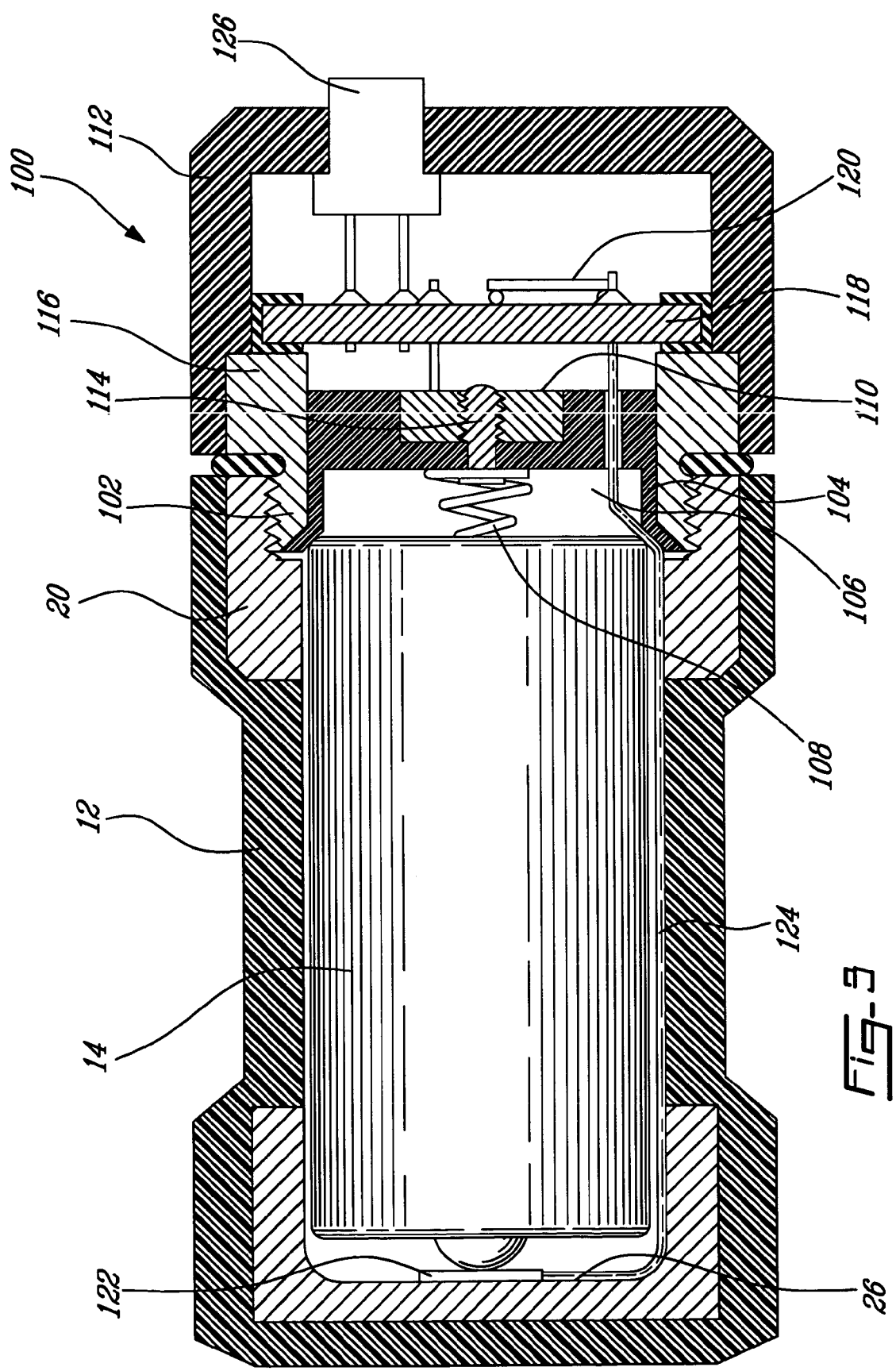
FIG. 3 is a cutaway view of a device in accordance with an illustrative embodiment of the present invention.

Referring now to FIG. 3 in addition to FIGS. 1 and 2, a battery compartment adapter cap, generally referred using the reference numeral 100, in accordance with an illustrative embodiment of the present invention will be described. The battery compartment adapter cap 100 is intended to replace conventional battery compartment caps, such as the battery compartment cap 18. The adapter cap 100 comprises a threaded portion 102, manufactured from a conductive material such as brass, and adapted to mate with the threaded end 20 of the battery compartment 12 thereby allowing electrical energy to flow between the threaded portion 102 and the threaded end 20 of the battery compartment 12. A dielectric insert 104 fabricated from a non conductive material is inserted into the mouth 106 of the adapter cap 100 which is defined by the threaded portion 102. Alternatively, the inside of threaded portion 102 could be coated with a dielectric material. In this manner, the dielectric insert 104 maintains the anode 34 (or cathode 36 depending on orientation) of a battery 14 held in the battery compartment 12 normally isolated from the conductive threaded portion 102 of the adapter cap.

Still referring to FIG. 3, as the adapter cap 100 is screwed onto the threaded end 20 of the battery compartment 12, a biasing means 108, such as spring, manufactured from a conductive material such as steel, engages the anode 34 (or cathode 36 depending on orientation) of the battery 14, thereby biasing the battery 14 toward the closed end 26 of the battery compartment 12 thus holding the battery 14 securely therein. The biasing means 108 is in turn fastened to a contact plate 110 encapsulated within the nonconductive cover 112 of the adapter cap 100, manufactured from a conductive material such as brass, by means of a fastener 114 (such as a bolt, screw, rivet, or the like), also manufactured from a conductive material such as steel. As a result, the anode 34 (or cathode 36 depending on orientation) of the battery 14 is in direct electrical contact with the conductive contact plate 110, but not, as in the case of the conventional battery compartment cap 18, with the threaded end 20 of the battery compartment 12.

Referring back to FIG. 2, severing direct contact between the anode (or cathode 36 depending on orientation) of the battery 14 from the threaded end 20 of the battery compartment 12, and thus the PCB 24 onto which are mounted the electronics (not shown) and the elements 16, allows the device 10 to be adapted to a variety of different uses by providing a series of adapter caps which carry out different functions. For example, referring back to FIG. 3, a simple two conductor cable with a first conductor soldered to the contact plate 110 and a second conductor soldered to a contact surface 116 of the threaded portion 102, with a single pole switch attached between the far ends of the first conductor and the second conductor, would allow the electronic device 10 to be activated from remote position by simply flipping the switch and closing the circuit.

Alternatively, still referring to FIG. 3, for example, illustratively a Printed Circuit Board (PCB) 118 could be encapsulated within the cap, the PCB 118 having conductive traces (not shown) etched therein as well as conductive pads (also not shown) for mounting electronic switch electronics as in 120 and the like using, for example, conductive solder. Additionally, in order to supply the electronics 120 mounted on the PCB 118 provision is made by way of a conductive plate 122 located at the closed end 26 of the battery compartment 12. An insulated conductor 124, such as a wire or conductive strip, is also provided to interconnect the conductive plate 122 and the PCB 118. Of course, given that the polarity of the battery may be reversed during operation, provision must also be made within the electronics 120 of a battery polarity converting device (not shown) to ensure that the correct voltage and current is provided to the electronics. Alternatively, the electronics 120 on the PCB 118 could be supplied with power from a dedicated source, such as a small mignon cell or other types of batteries (all not shown) with provision of suitable adaptations to the adaptor cap 10. As will now be apparent to a person of ordinary skill in the art, by interconnecting the contact plate 110 and the contact surface 116 via the electronics mounted on the PCB 118, sophisticated devices can be developed for switching the electronic device 10 on and off, for example by sensing or detecting changes in the devices immediate environment. Such device environment changes include, for example, a change in pressure, change in light incident on the device, sensing of noxious gasses, detection of movement, sensing of sound, submersion of the device in water, etc.. Additionally, provision can made for operating the device remotely, for example though provision of a wireless interface. A variety of possible configurations are possible. The following is a nonlimiting series of possible embodiments:

- A photodiode 126 or similar light sensitive device could be mounted in the nonconductive cover 112 allowing the device 10 to automatically actuate the switch by completing the circuit between the contact plate 110 and the contact surface 116, thus powering up the electronic device 10 when the amount of light incident on the photodiode 126 falls below (or rises above) a pre-determined level;
- alternatively, the photodiode 126 could be replaced by a water sensor, (along with suitable adaptation of the electronics on the PCB 118 of course), thereby allowing the device 10 to automatically actuate the switch by completing the circuit between the contact plate 110 and the contact surface 116 for example when the device 10 is submerged in water;
- the photodiode 126 could be replaced by a device sensitive to infra-red light (along with suitable adaptation of the electronics on the PCB 118), thereby allowing the switch to be actuated by remotely completing the circuit between the contact plate 110 and the contact surface 116 using an infra-red emitter;
- the photodiode 126 could be replaced by a motion detector (along with suitable adaptation of the electronics on the PCB 118), thereby allowing the switch to be actuated automatically by completing the circuit between the contact plate 110 and the contact surface 116 when an object moves within range of the device 10;
- the photodiode 126 could be replaced by a small microphone (along with suitable adaptation of the electronics on the PCB 118), thereby allowing the switch to be actuated automatically by completing the circuit between the contact plate 110 and the contact surface 116 when a triggering sound, for example sound in a particular frequency range exceeding a predetermined decibel level, is detected in the vicinity of the device 10;
- the photodiode 126 could be replaced by a pressure sensor, (along with suitable adaptation of the electronics on the PCB 118), thereby allowing the switch to be actuated automatically by completing the circuit between the contact plate 110 and the contact surface 116 when the ambient pressure exceeds or is under a predetermined value;
- the photodiode 126 could be replaced by a gas sensor, for example for carbon monoxide, (along with suitable adaptation of the electronics on the PCB 118), thereby allowing the switch to be actuated automatically by completing the complete the circuit between the contact plate 110 and the contact surface 116 when the particular gas is detected in the vicinity of the device 10;
- the photodiode 126 could be replaced by a switch adapted for attachment to a trip-wire (along with suitable adaptation of the electronics on the PCB 118). In this embodiment, the circuit between the contact plate 110 and the contact surface 116 would be completed when the switch was is closed by a triggering tension applied to the trip wire. The switch could be biased normally open, for example using a spring, such that once a triggering tension is removed from the trip wire, the switch returns to its normally open position. Additionally, a sound emitting device, such as a piezo electric membrane, could also be built into the adapter cap 100 to provide an audible warning;
- a RF-receiver could be mounted on the PCB 118 along with the requisite electronics, thereby allowing the circuit between the contact plate 110 and the contact surface 116 to be completed remotely using a RF transmission; etc.

On the other hand, the provision of an adapter cap 100 can also be used to provide other features not otherwise available with the electronic device 10.

Figure 4A:
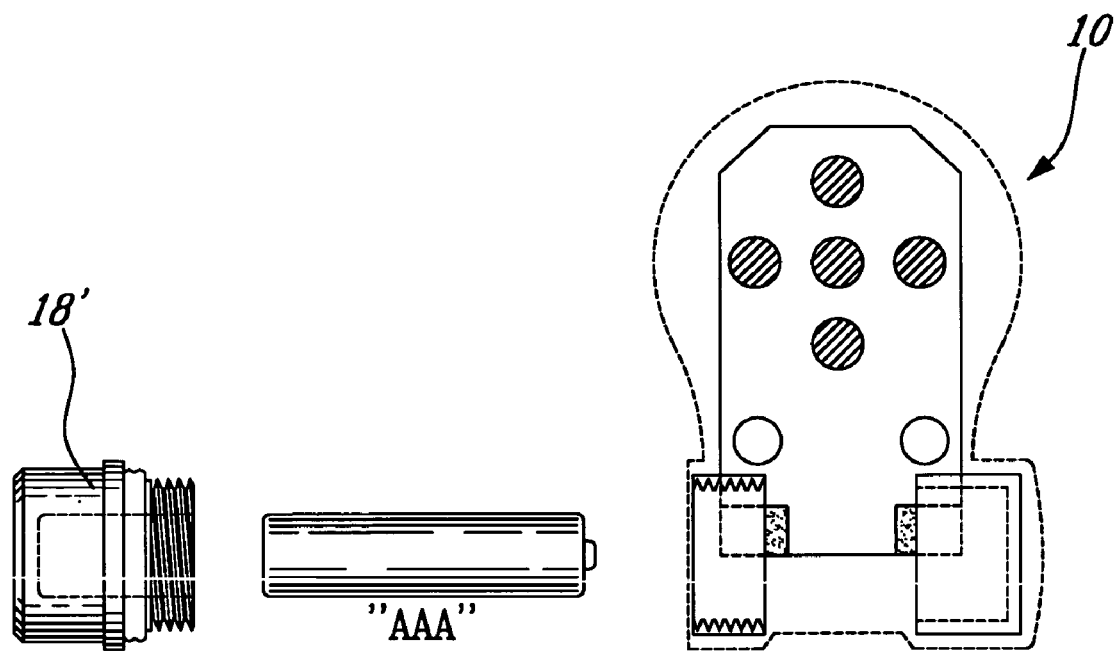
FIGS. 4A through 4C provide embodiments of adapter caps for adapting different classes of batteries for powering a device.
Figure 4B:
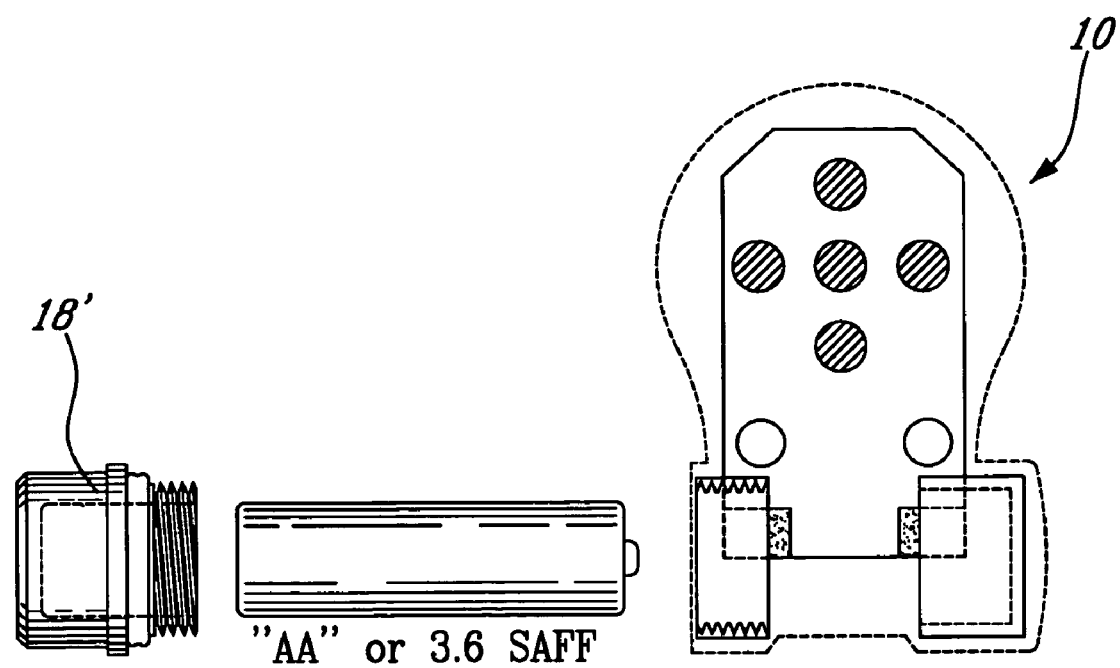
Figure 4C:
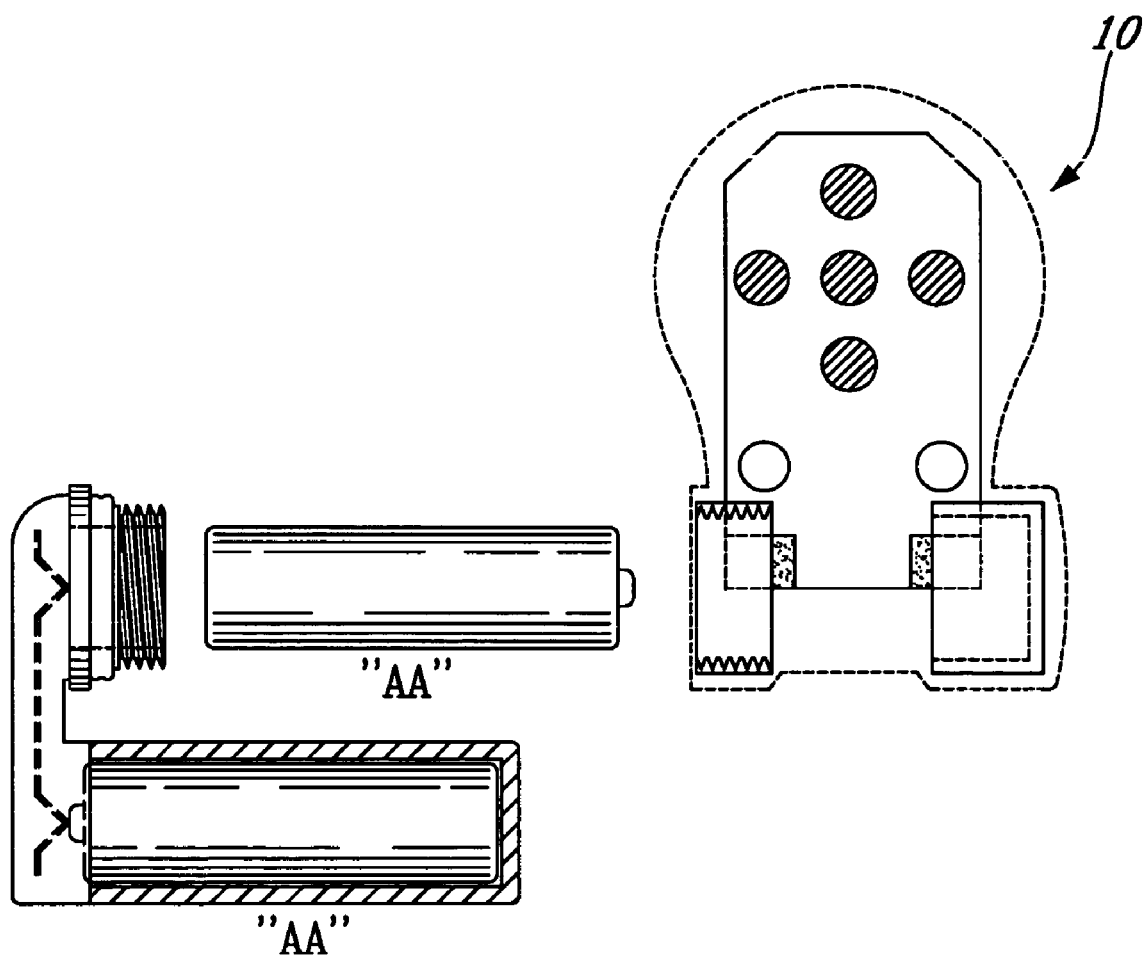

In the present illustrative embodiment, the electromagnetic radiation emitting sources 16 as well as the electronics which drive them can be powered from powers sources having a variety of different output voltages. It will be apparent to a person of ordinary skill in the art that the battery 14 used to illustrate the present invention is a battery of the 123A type having a nominal output voltage of 3 volts. Referring now to FIGS. 4A through 4C, by providing different caps, adapted to different battery sizes, batteries other than those of the 123A type, and even multiple batteries, can be used to power the device 10.

Figure 5A:
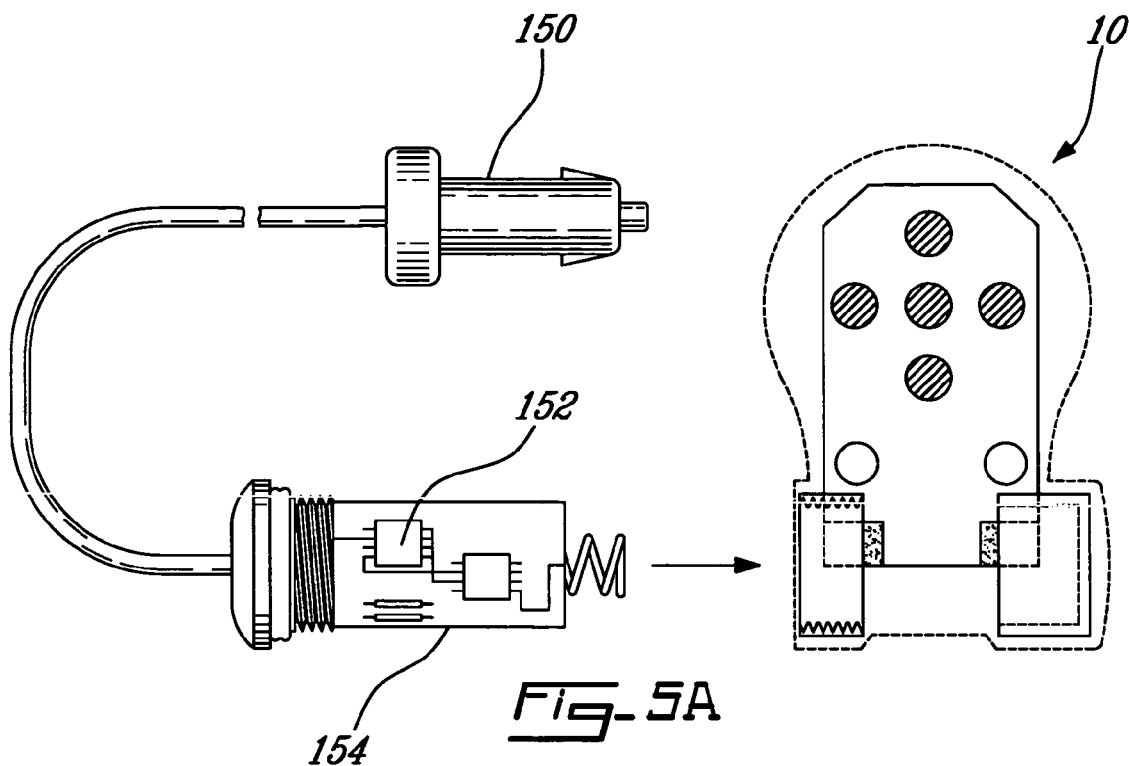
FIGS. 5A and 5B provide embodiments of adapter caps for adapting different non battery power sources for powering a device in accordance with alternative and second alternative illustrative embodiments of the present invention.

Referring now to FIG. 5a, in an alternative embodiment a car lighter adapter 150 is attached to the adapter cap which, via electronics as in 152 mounted on a printed circuit board (PCB) 154 provides power to the device 10. In this regard, the output of a car battery is typically 12 volts and therefore the electronics would include, for example, an isolated DC/DC converter providing a 3V DC output.

Figure 5B:
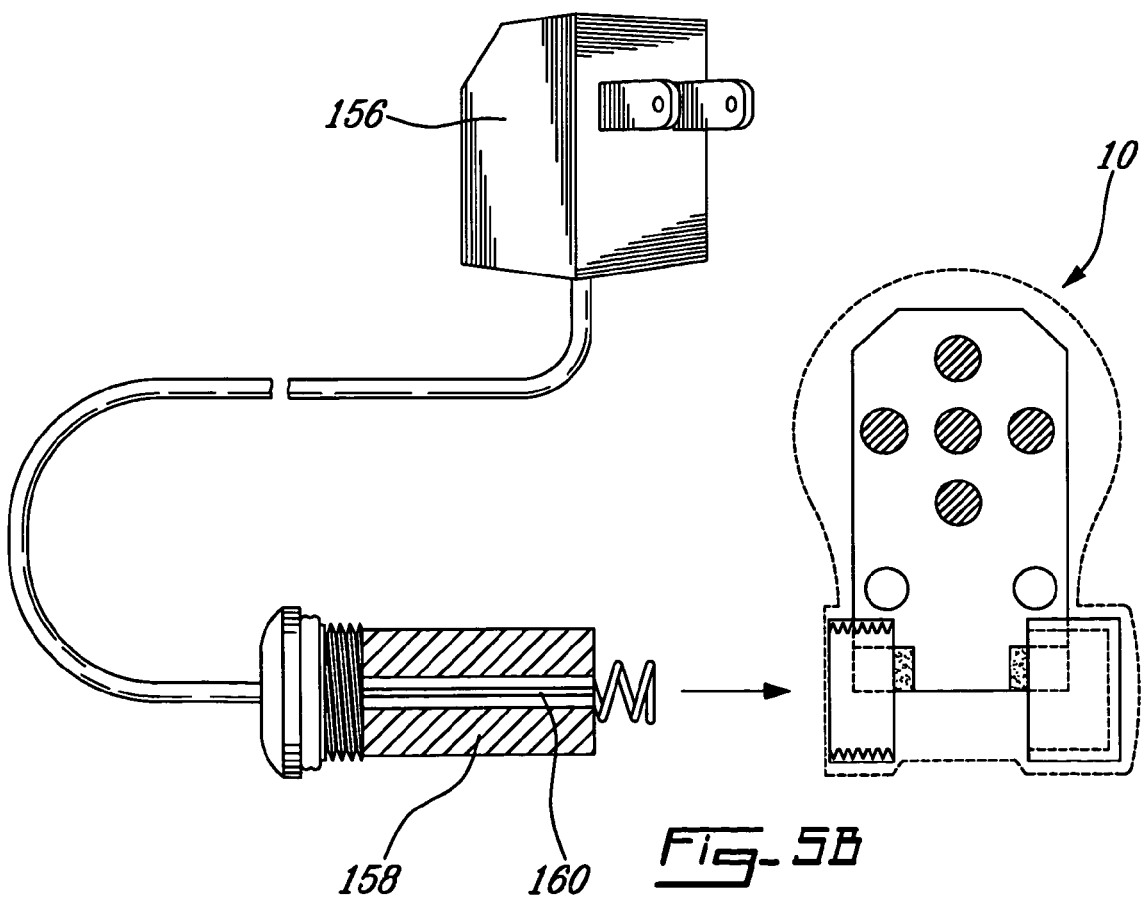

Similarly, in FIG. 5b, in a second alternative embodiment a 120 VAC transformer 156 having a 3V DC output uses mains current to supply the device via an adapter cap 18' comprised of a hollow plug 158 manufactured from a dielectric material isolating a central conductor 160.

Figure 6:
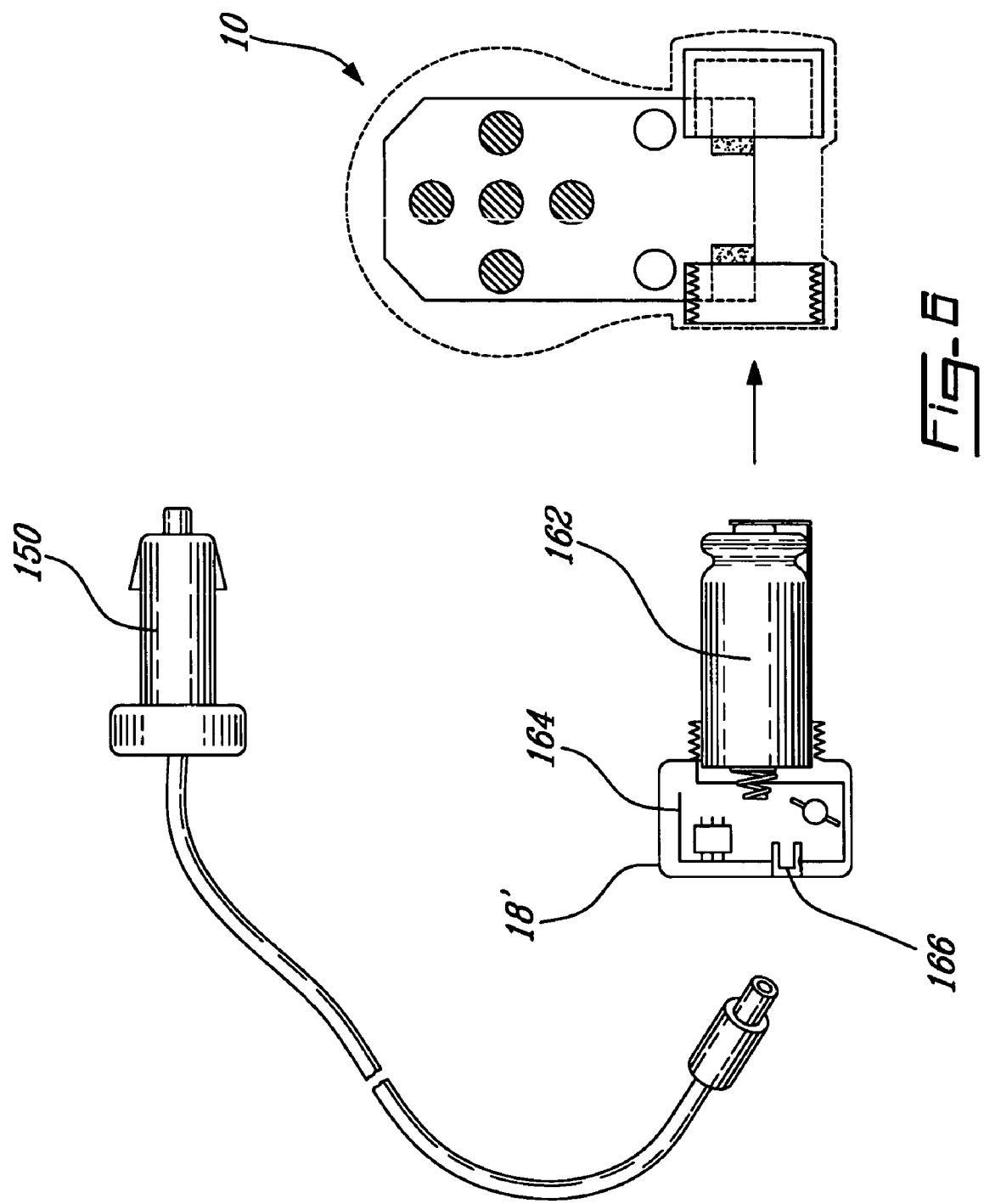
FIG. 6 provides an embodiment of an adapter cap including a rechargeable power source and charger in accordance with a third alternative illustrative embodiment of the present invention.

Referring now to FIG. 6, in a third illustrative embodiment the adapter cap can be modified to house a rechargeable battery 162, for example a rechargeable 3.6V lithium battery, and battery charger circuit 164. Power for the battery charger circuit 164 could be provided, for example, via a car lighter adapter 150 which would plug into a socket 166 located in the adapter cap 18'.

Figure 7:
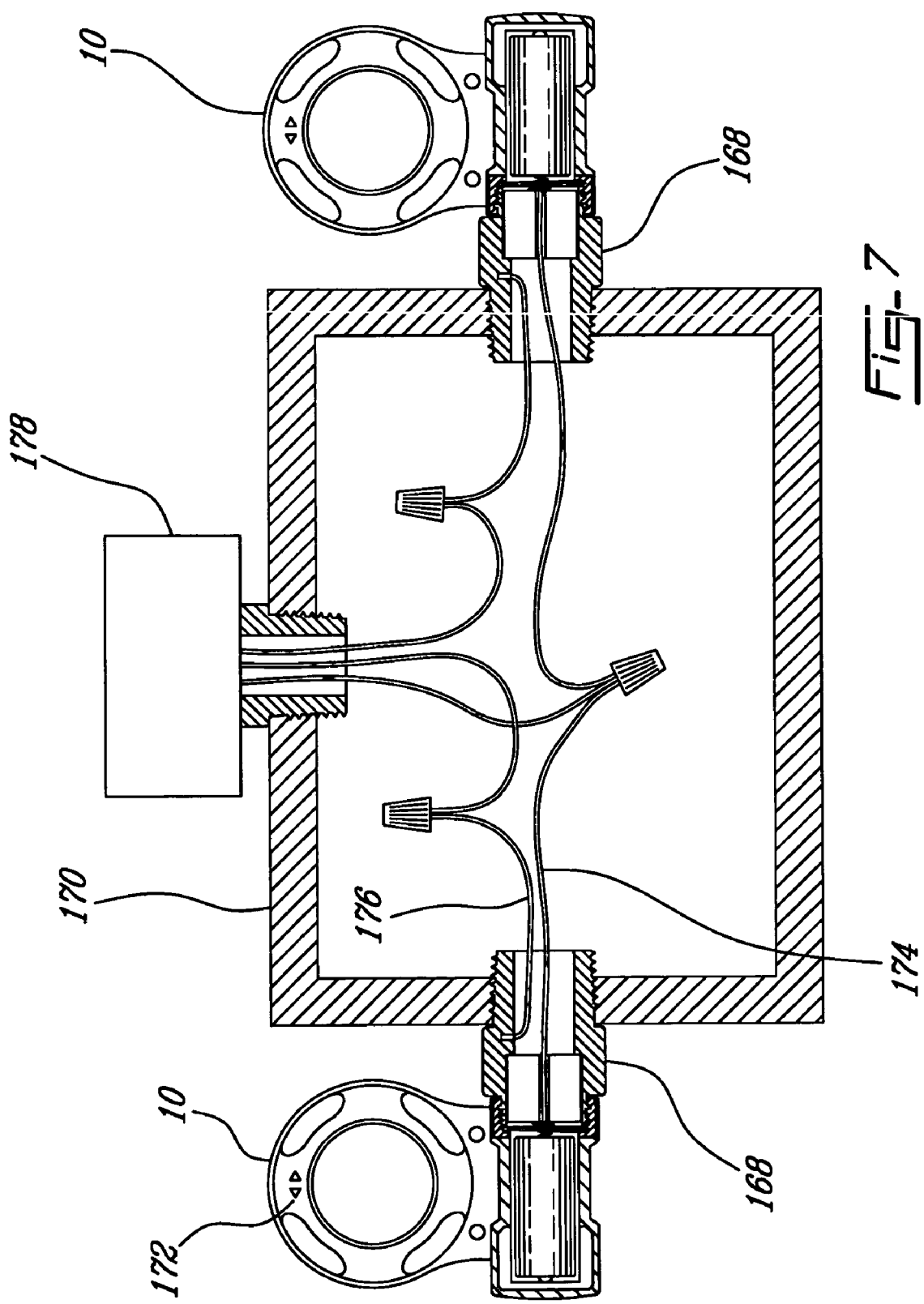
FIG. 7 provides an embodiment of an adapter cap for providing a sealed interconnect between a device and an electrical junction box in accordance with a fourth alternative illustrative embodiments of the present invention.

Referring now to FIG. 7, in a fourth illustrative embodiment, the adaptor cap provides a sealed interconnect 168 between a signalling device as in 10 and, for example, an electrical junction box 170, or the like. Typically foreseen for use in harsh environments, when device 10 has been activated, for example by rotation of the rotary switch 172 to a predefined signalling position, interconnection of the ends of the insulated conductive wires 174, 176 provides current to the device 10, thereby causing it to emit signals according to the selected switch position. By placing a switch 178, for example a proximity sensor, gas sensor or the like, between the ends of the conductive wires 174,176, the device 10 can be used in a variety of signalling applications.

Figure 8:
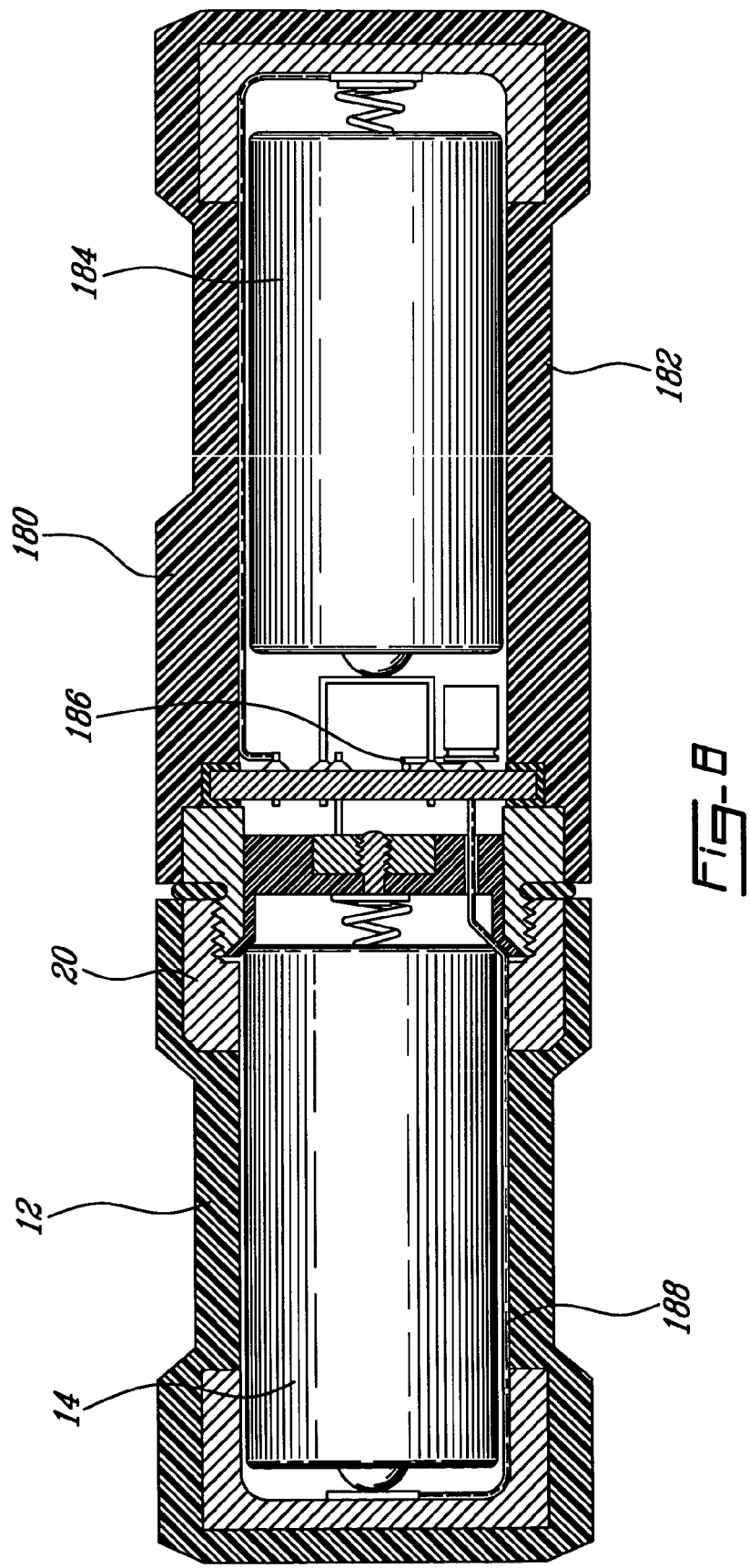
FIG. 8 provides an embodiment of an adapter cap comprising a supplementary power source and voltage conditioning electronics in accordance a fifth alternative illustrative embodiments of the present invention.

Referring now to FIG. 8, in a fifth illustrative embodiment, the adaptor cap 18 is replaced by a power module 180 comprised of a supplementary battery compartment 182 for holding a supplementary DC power source 184, such as a battery or battery pack. The supplementary battery compartment 182 is manufactured from a similar non-conductive material as the housing of the device 10 and, in operation, is simply screwed onto the threaded end 20 of the battery compartment 12. The power module 180 also includes an electronic converter 186 for converting/conditioning the voltage output of the supplementary power source 184 to match the nominal voltage output of the battery 14. Such converter electronics comprise, for example, a diode bridge as known in the art and, as necessary, a DC/DC converter or other circuits for conditioning the output voltage and current, such as a charge pump, voltage booster, staged voltage multiplier circuit or the like. As known in the art, charge pumps, voltage boosters, staged voltage multiplier circuits and the like are able to generate output voltages which differ from their input voltages, in its simplest form allowing the voltage to be doubled by driving a circuit comprised of capacitors and diodes using a square wave. Other circuits, which are typically in the form of single-chip integrated packages, allow for accurate setting of the output voltage to predetermined values.

Still referring to FIG. 8, in operation, and as discussed above, the output voltage of the converter 186 is conditioned to match a nominal voltage output (i.e. the rated or characteristic operating voltage) of the battery 14. The output voltage of the converter 186 is attached in parallel with the battery 14 (via the provision of suitable interconnections such as insulated conductors as in 188 between the power module 180 and the battery 14) between the first conductive pad (reference 22 on FIG. 2) and the second conductive pad (reference 28 on FIG. 2). It will now be apparent to a person of ordinary skill in the art that provision of the power module 180 allows the device 10 to be powered by a variety of alternative DC power sources, such as batteries of different voltages or battery packs comprised of a plurality of individual cells and the like (all not shown) without removing the battery 14 from the battery compartment 12. Of course, the use of batteries or battery packs having different shapes in the power module 180 will require similar changes in the supplementary battery compartment 182.

Figure 9:
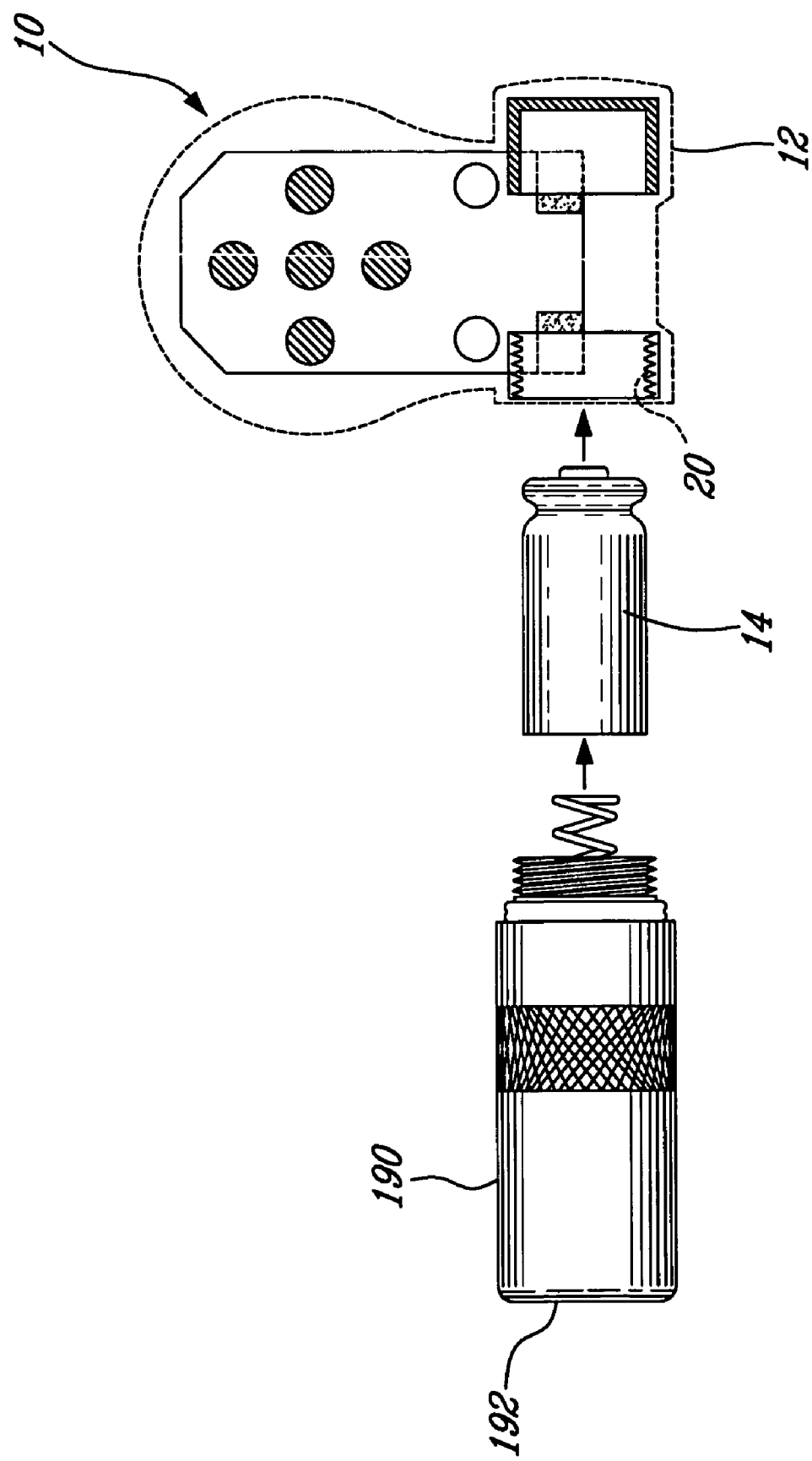
FIG. 9 provides an embodiment of an adapter cap comprising a laser module in accordance with a sixth alternative illustrative embodiments of the present invention.

Referring now to FIG. 9, in a sixth illustrative embodiment, the adaptor cap is replaced by a laser module 190 which can be mounted on the threaded end 20 of the battery compartment 12. The laser module 190 emits laser light through an aperture located at an emitting end 192 and can include a power source (not shown) or, alternatively, with provision of appropriate interconnections, can also be powered by the battery 14. Additionally, the laser module 190 can be combined with the power module 180 to provide a self power laser module which also can be used to power the device 10.

It is to be understood that the invention is not limited in its application to the details of construction and parts illustrated in the accompanying drawings and described hereinabove. The invention is capable of other embodiments and of being practised in various ways. It is also to be understood that the phraseology or terminology used herein is for the purpose of description and not limitation. Hence, although the present invention has been described hereinabove by way of preferred embodiments thereof, it can be modified, without departing from the spirit, scope and nature of the subject invention as defined in the appended claims.

What is claimed is:

1. A signaling device comprising:
    an emission module operative on the application of battery power from a battery pack and comprising at least one electromagnetic radiation emitting element, an electromagnetic radiation emitting element controller and a multi-position switch for selecting one of a plurality of predetermined control signatures;
    a battery compartment;
    a first cap for retaining said battery pack in said compartment, wherein when said first cap is installed on said compartment said controller illuminates said at least one electromagnetic radiation emitting element according to said selected control signature; and
    at least one adaptor cap interchangeable with said first cap, said at least one adaptor cap comprising a second battery powering a second switch for controlling said application of battery power, wherein when said second switch is closed, said controller illuminates said at least one electromagnetic radiation emitting element according to said selected control signature.

2. The device of claim 1, wherein said at least one electromagnetic radiation emitting element is selected from the group consisting of LEDs, lasers, incandescent lights, thermal emitters, xenon strobes and combinations thereof.

3. The device of claim 1, wherein said adaptor cap further comprises a trip wire and wherein said second switch is by applying a triggering tension to said trip wire.

4. The device of claim 1, wherein said adaptor cap further comprises a water sensor powered by said second battery and wherein said second switch is actuated by submerging said water sensor in water.

5. The device of claim 1, wherein said adaptor cap further comprises at least one photosensitive element powerd by said second battery and wherein said second switch is actuated when light incident on said photosensitive element exceeds a predetermined value.

6. The device of claim 1, wherein said adaptor cap further comprises at least one photosensitive element powerd by said second battery and wherein said second switch is actuated when light incident on said photosensitive element is below a predetermined value.

7. The device of claim 1, wherein said adaptor cap further comprises a motion detector powerd by said second battery and wherein said second switch is actuated when an object is moved within a range of said detector.

8. The device of claim 1, wherein said adaptor cap further comprises a microphone powerd by said second battery and wherein said second switch is actuated when said microphone is exposed to a triggering sound.

9. The device of claim 1, wherein said adaptor cap further comprises a pressure sensor powerd by said second battery for sensing an ambient pressure and wherein said second switch is actuated when said sensed ambient pressure exceeds a predetermined value.

10. The device of claim 1, wherein said adaptor cap further comprises a pressure sensor powerd by said second battery for sensing an ambient pressure and wherein said second switch is actuated when said sensed ambient pressure is below a predetermined value.

11. The device of claim 1, wherein said adaptor cap further comprises a gas sensor powerd by said second battery for detecting a predetermined type of gas and wherein said second switch is actuated when said gas is detected.

12. The device of claim 1, wherein said adaptor cap further comprises a wireless receiver powerd by said second battery and wherein said second switch is actuated when a wireless signal is received from a transmitter.

13. The device of claim 12, wherein said wireless receiver comprises an RF receiver and said transmitter comprises an RF transmitter.

14. The device of claim 12, wherein said wireless receiver comprises an infra red receiver and said transmitter comprises an infra-red transmitter.

15. The device of claim 1, wherein said at least one light emitting element emits visible light.

16. The device of claim 1, wherein said at least one light emitting element emits infra-red light.

17. The device of claim 1, wherein said multi-position switch comprises a rotary switch.

18. A signaling device comprising:
   an emission module operative on the application of battery power from a battery pack for the emission of a signal from at least one electromagnetic radiation emitting element;
   a battery compartment;
   a first cap for retaining said battery pack in said battery compartment, wherein when said first cap is installed on said compartment said controller illuminates said at least one electromagnetic radiation emitting element according to said selected control signature; and
   at least one adaptor cap interchangeable with said first cap, said adaptor cap comprising:
      a second battery:
      a wireless receiver powerd by said second battery and a switch powerd by said second battery,
      said switch for controlling said application of battery power,
         wherein said switch is actuated when said receiver receives a wireless signal from a transmitter.

19. The device of claim 18, wherein said wireless receiver comprises an RF receiver and said transmitter comprises an RF transmitter.

20. The device of claim 18, wherein said wireless receiver comprises an infra red receiver and said transmitter comprises an infra-red transmitter.

21. A signaling device comprising:
   an emission module operative on the application of battery power from a battery pack for the emission of a signal from at least one electromagnetic radiation emitting element;
   a battery compartment;
   a first cap for retaining said battery pack in said battery compartment, wherein when said first cap is installed on said compartment said controller illuminates said at least one electromagnetic radiation emitting element according to said selected control signature; and
   at least one adaptor cap interchangeable with said first cap, said at least one adaptor cap comprising:
      a second battery;
      at least one sensor powerd by said second battery and a switch powerd by said second battery, said switch for controlling the application of battery power, wherein said switch is actuated when said at least one sensor detects a device environment change.

22. The device of claim 21, wherein said at least one electromagnetic radiation emitting element is selected from the group consisting of LEDs, lasers, incandescent lights, thermal emitters, xenon strobes and combinations thereof.

23. The device of claim 21, wherein the at least one electromagnetic radiation emitting element comprises at least one LED.

24. The device of claim 21, wherein said at least one sensor comprises a photosensitive element and said device environment change comprises an increase in a strength of light incident on said photosensitive element above a predetermined threshold.

25. The device of claim 21, wherein said at least one sensor comprises a photosensitive element and said device environment change comprises a decrease in a strength of light incident on said photosensitive element below a predetermined threshold.

26. The device of claim 21, wherein said at least one sensor comprises a pressure sensor and said device environment change comprises an increase in pressure above a predetermined threshold.

27. The device of claim 21, wherein said at least one sensor comprises a pressure sensor and said device environment change comprises a decrease in pressure below a predetermined threshold.

28. The device of claim 21, wherein said at least one sensor comprises a motion detector and said device environment change comprises movement of an object into a range of said detector.

29. The device of claim 21, wherein said at least one sensor comprises a water sensor and said device environment change comprises submerging said water sensor in water.

30. The device of claim 21, wherein said at least one sensor comprises a gas sensor responsive to a predetermined gas and said device environment change comprises an increase in an amount of said predetermined gas above a predetermined threshold.

31. The device of claim 21, wherein said at least one sensor comprises a gas sensor responsive to a predetermined gas and said device environment change comprises a decrease in an amount of said predetermined gas below a predetermined threshold.

32. The device of claim 21, wherein said at least one sensor comprises a microphone and said device environment change comprises an increase in a triggering sound above a predetermined decibel level.

33. A signaling device comprising:
   an emission module operative on the application of battery power from a battery pack for the emission of a signal from at least one electromagnetic radiation emitting element;
   a battery compartment;
   a first cap for retaining said battery pack in said battery compartment,
      wherein when said first cap is installed on said compartment said controller illuminates said at least one electromagnetic radiation emitting element according to said selected control signature; and
   at least one adaptor cap interchangeable with said first cap, said at least one adaptor cap comprising:
      a trip wire,
      a second battery;
      a sound emitting device powerd by said second battery; and
      a switch for controlling said application of battery power, wherein said switch is closed and said sound is emitted when a triggering tension is applied to said trip wire.

34. The device of claim 33, wherein said switch comprises a biasing member for biasing said switch normally open.

* * * * *